(12) United States Patent
Henrard et al.

(10) Patent No.: US 9,969,341 B2
(45) Date of Patent: May 15, 2018

(54) ASSISTANCE DEVICE AND METHOD FOR A POWER GENERATION SYSTEM OF AN AIRCRAFT

(71) Applicant: Labinal Power Systems, Blagnac (FR)

(72) Inventors: Pierre Henrard, Cazeres (FR); Nicolas Carre, Toulouse (FR); Bruno Chapotin, Toulouse (FR)

(73) Assignee: LABINAL POWER SYSTEMS, Blagnac (FR)

( * ) Notice: Subject to any disclaimer, the term of this patent is extended or adjusted under 35 U.S.C. 154(b) by 189 days.

(21) Appl. No.: 14/895,779

(22) PCT Filed: Jun. 6, 2014

(86) PCT No.: PCT/FR2014/051371
§ 371 (c)(1),
(2) Date: Dec. 3, 2015

(87) PCT Pub. No.: WO2014/199056
PCT Pub. Date: Dec. 18, 2014

(65) Prior Publication Data
US 2016/0129862 A1     May 12, 2016

(30) Foreign Application Priority Data

Jun. 10, 2013 (FR) .................................. 13 55347

(51) Int. Cl.
*B60L 1/00*     (2006.01)
*B60R 16/03*     (2006.01)
(Continued)

(52) U.S. Cl.
CPC .............. *B60R 16/03* (2013.01); *B64D 47/00* (2013.01); *H01H 47/04* (2013.01); *H02H 7/06* (2013.01);
(Continued)

(58) Field of Classification Search
CPC ......... C08L 67/04; C08L 67/02; A01G 25/16; C05B 2219/2625
See application file for complete search history.

(56) References Cited

U.S. PATENT DOCUMENTS

2012/0173173 A1* 7/2012 Spierling ................ F01D 15/10
                                                                                  702/58
2013/0008145 A1* 1/2013 Sundstrom ................ F02K 1/12
                                                                                  60/226.2

FOREIGN PATENT DOCUMENTS

DE       40 24 496 A1    2/1992
EP        1 220 409 A1    7/2002
(Continued)

OTHER PUBLICATIONS

International Search Report dated Jul. 8, 2014.
Elektor Electronics, "Reducing Relay Power Consumption", vol. 29, No. 327, Dec. 1, 2003, 42 pages.

*Primary Examiner* — Sibin Chen
(74) *Attorney, Agent, or Firm* — Womble Bond Dickinson (US) LLP

(57) ABSTRACT

The invention relates to an assistance device (17) for an electrical power generation system (11) of an aircraft, said system (11) comprising a generator (13), a regulator (14) and a contactor (15) comprising contacts and an actuator for opening/closing the contacts which is controlled by said regulator (14) and arranged between the generator (13) and a distribution architecture (12), the assistance device being characterized in that it is connected to at least one power source (18) which is separate from the generator (13) and the regulator (14), and in that it comprises means for closing the contactor which are suitable for connecting the power source (18) to the actuator (23) of the contactor (15) in order to provide the current necessary for closing said contactor (15).

9 Claims, 2 Drawing Sheets

Figure 1:
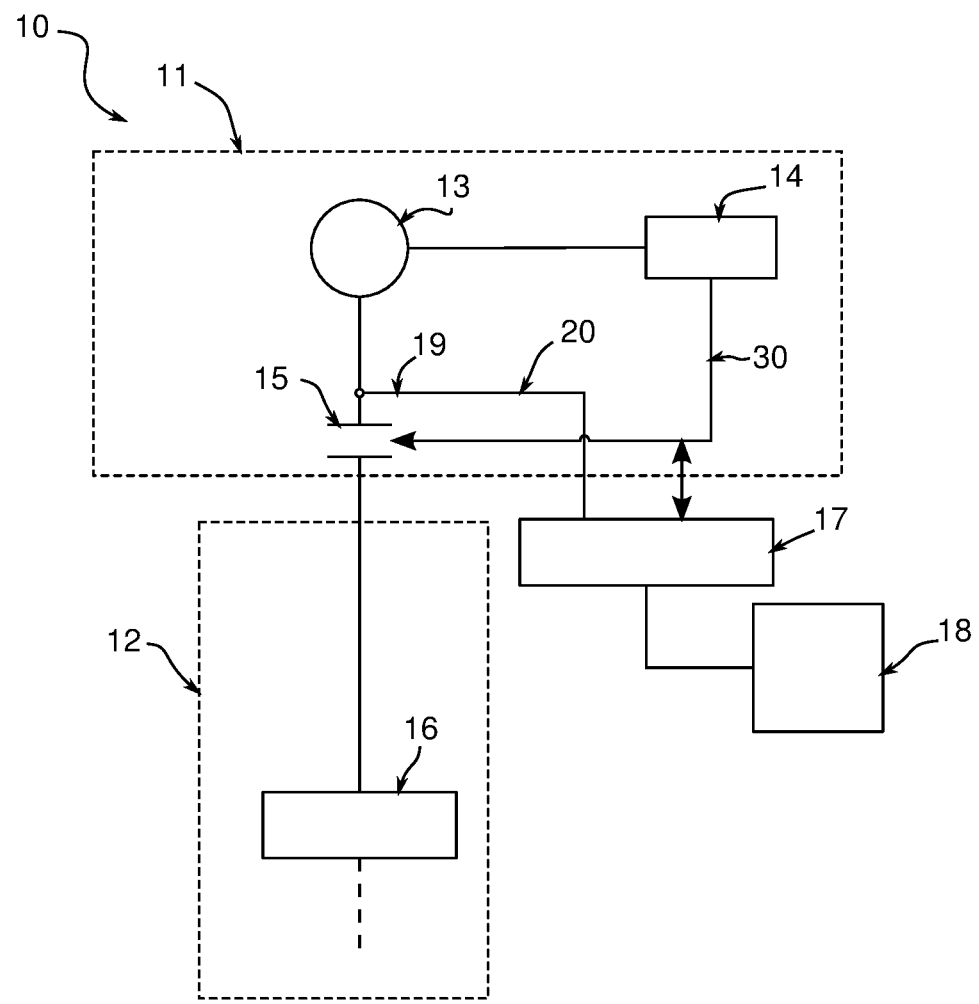

(51) Int. Cl.
   *H01H 47/04*     (2006.01)
   *H02J 1/00*      (2006.01)
   *H02J 3/00*      (2006.01)
   *B64D 47/00*     (2006.01)
   *H02H 7/06*      (2006.01)
   *H02J 4/00*      (2006.01)
   *H01H 47/22*     (2006.01)

(52) U.S. Cl.
   CPC ............... *H02J 1/00* (2013.01); *H02J 3/00* (2013.01); *H02J 4/00* (2013.01); *B64D 2221/00* (2013.01); *H01H 47/22* (2013.01)

(56) References Cited

FOREIGN PATENT DOCUMENTS

| EP | 2 482 445 A2 | 8/2012 |
| WO | WO 2011/095223 A1 | 8/2011 |
| WO | WO 2012/069869 | 5/2012 |

* cited by examiner

ASSISTANCE DEVICE AND METHOD FOR A POWER GENERATION SYSTEM OF AN AIRCRAFT

1. TECHNICAL FIELD OF THE INVENTION

The invention relates to an assistance device for an electrical power generation system of an aircraft. The invention also relates to a system comprising an assistance device of this kind, and to an assistance method for an electrical power generation system of an aircraft.

2. TECHNICAL BACKGROUND

The electrical architecture of an aircraft is made up, in a known manner, of an electrical distribution architecture and an electrical power generation system. Each type of aircraft generally has a specific distribution architecture which is adapted to its needs. The electrical power generation system, for its part, is more standard and can be adapted to several types of aircraft. This electrical power generation system, which is already proven and qualified for aeronautics, makes it possible for the aircraft manufacturer, when reusing said system, to achieve substantial savings when developing a new aircraft. In a known manner, an electrical power generation system comprises a generator, a regulator and a contactor comprising contacts and an actuator for opening/closing the contacts which is controlled by said regulator and arranged between the generator and a distribution architecture. An electrical power generation system of this kind is disclosed, for example, in the patent application EP2482445. However, some of these elements of the electrical power generation system may not be compatible with the new generations of electrical equipment, in particular with the contactor. Indeed, the inrush current of the new-generation contactors (energy-saving contactors) are not compatible with the current capabilities of older regulators. Moreover, some of these elements may not conform to new standards or changes in requirements (such as the Development Assurance Level, DAL) which are needed for use in an aircraft.

3. OBJECTS OF THE INVENTION

The invention aims to mitigate at least some of the drawbacks of known electrical power generation systems.

In particular, the invention aims to provide, in at least one embodiment of the invention, an assistance device for an electrical power generation system of an aircraft which makes the system compatible with the new generations of electrical equipment, in particular the energy-saving contactors.

The invention also aims to provide, in at least one embodiment, an assistance device for an existing electrical power generation system which is already qualified for aeronautical use, without modifying the operation thereof, but while complementing new specifications.

The invention also aims to provide, in at least one embodiment, an assistance device which functions as protection against electrical malfunctions in the generator, such as overvoltages or excess frequencies.

The invention also aims to provide an electrical power generation system which is assisted by an assistance device according to the invention.

The invention also aims to provide, in at least one embodiment, an assistance method for an electrical power generation system.

The invention also aims to provide, in at least one embodiment, an assistance method for an electrical power generation system of an aircraft by means of an assistance device which makes it possible to mitigate failures in the operation of the system.

4. SUMMARY OF THE INVENTION

In order to achieve this, the invention relates to an assistance device for an electrical power generation system of an aircraft, said system comprising a generator, a regulator and a contactor comprising contacts and an actuator for opening/closing the contacts which is controlled by said regulator and arranged between the generator and a distribution architecture, the assistance device being characterised in that it is connected to at least one power source which is separate from the generator and the regulator, and in that it comprises means for closing the contactor which are suitable for connecting the power source to the contactor actuator in order to provide the current necessary for closing said contactor.

The assistance device is thus suitable for being supplied by the power source which is separate from the generator and the regulator.

"Contactor" means any electrical component which makes it possible to switch the electrical connection by means of an actuator, the electrical connection being made by contacts intended to withstand the current load between the generator and the distribution architecture.

An assistance device according to the invention thus makes it possible to ensure the closure of the contactor without modifying the existing generating components on account of the provision of current by said power source. In particular, the regulator retains the function of monitoring the opening and closing of the contactor. The assistance device makes it possible to provide the current necessary for closing a new-generation contactor, which a regulator qualified for existing systems does not necessarily make possible. An assistance device according to the invention therefore makes it possible to adapt the existing systems to new electrical equipment.

Advantageously and according to the invention, the means for closing the contactor comprise a first electric relay comprising contacts and an actuator for opening/closing the contacts, said contacts being suitable for connecting the regulator to the contactor actuator, and the actuator of said relay being connected to the power source.

"Relay" means any electrical component which makes it possible to switch the electrical connection by means of an actuator (for example a coil), the electrical connection being made by contacts, such as an electromechanical relay, a static relay, or any other controlled switch.

According to this aspect of the invention, the assistance device can disconnect the regulator and the contactor actuator in order not to overload the regulator with current when the contactor is closed, or connect said components in order that the regulator can actuate the contactor.

Advantageously and according to the invention, the means for closing the contactor comprise an electric relay, referred to as a second relay, comprising contacts and an actuator for opening/closing the contacts, said contacts being suitable for connecting the power source to the contactor actuator, and the actuator of said second relay being connected to the regulator.

According to this aspect of the invention, the regulator can connect the power source and the contactor actuator in order for the power source to provide the current necessary for closing the contactor, or to disconnect said components in order that the assistance device does not disrupt the connection between the regulator and the contactor actuator.

Advantageously and according to the invention, the first relay is a normally closed relay and the second relay is a normally open relay.

"Normally closed relay" means a relay which is in the closed position when the actuator thereof is not supplied with power. In an analogous manner, "normally open relay" means a relay which is in the open position when the actuator thereof is not supplied with power.

According to this aspect of the invention, in the event of a malfunction in the assistance device, the power source thereof is disconnected from the relay actuator and the regulator remains connected to the relay actuator and can open said relay if necessary.

Advantageously and according to the invention, the assistance device comprises means for measuring the voltage and the frequency close to a point of regulation arranged between the generator and the contactor. "Point of regulation" means the point at which the regulator measures the voltage of the generator.

According to this aspect of the invention, the assistance device can measure voltages and frequencies and can thus play a role in protecting against electrical malfunctions such as overvoltages or excess frequencies in the electrical generator. The known electrical power generation systems generally comprise protection against overvoltages at the regulator. Here, therefore, the assistance device functions as additional protection.

Advantageously and according to the invention, the measuring means are suitable for measuring the voltages on three phases of the generator.

According to this aspect of the invention, the assistance device can detect any electrical malfunction in the generator.

Advantageously and according to the invention, the assistance device comprises at least one electronic board.

According to this aspect of the invention, the electronic board receives the various connections of the device.

Advantageously and according to the invention, the electronic board comprises at least one logic circuit.

According to this aspect of the invention, the logic circuit processes the voltage measurements provided by the measuring means, sends the disconnection signals to the generator, and receives status signals of various elements of the system.

The invention also relates to an electrical power generation system of an aircraft, comprising a generator, a regulator and a contactor comprising contacts and an actuator for opening/closing the contacts which is controlled by said regulator and arranged between the generator and a distribution architecture, characterised in that it is assisted by an assistance device according to the invention.

The invention also relates to an assistance method for an electrical power generation system of an aircraft, comprising a generator, a regulator and a contactor comprising contacts and an actuator for opening/closing the contacts which is controlled by said regulator and arranged between the generator and a distribution architecture, characterised in that it comprises a step of connecting the contactor actuator to a power source which is separate from the generator and the regulator in order to provide the current necessary for closing said contactor.

A method according to the invention thus makes it possible to ensure the closure of the contactor on account of the current provided by the power source of the assistance device.

Advantageously and according to the invention, the method comprises a step of connecting the regulator to the contactor actuator.

According to this aspect of the invention, the method allows the regulator to control the actuator of the contactor in order to keep the contactor closed by means of the current delivered by the regulator, or in order to open the contactor.

Advantageously and according to the invention, the method comprises the following steps, successively:
a step of disconnecting the regulator and the contactor actuator;
said step of connecting the contactor actuator to the power source in order to cause the closure of said contactor;
a step of connecting the regulator to the contactor actuator in order to keep the contactor closed;
a step of disconnecting the contactor actuator from the power source.

According to this aspect of the invention, in order to close the contactor, the regulator is disconnected from the contactor actuator and then the power source is connected to the contactor actuator in order to provide the electric current necessary for closing said contactor, and then the regulator is connected to the contactor actuator in order to keep the contactor closed, and finally the power source is disconnected from the contactor actuator in order to allow the regulator to control the contactor. This is the normal progression of the method.

Advantageously and according to the invention, the assistance method comprises a step of failure management involving sending a disconnection signal to the generator, said step being carried out when the regulator and the contactor actuator are not disconnected following the step of disconnecting the regulator from the contactor actuator, or when the contactor actuator and the power source are not disconnected following the step of disconnecting the contactor actuator from the power source.

According to this aspect of the invention, the method takes into account the possibilities of the disconnections not being carried out as intended. If the regulator and the contactor actuator are not disconnected, the normal progression of the method cannot occur. If the contactor actuator and the power source are not disconnected, the regulator can no longer open the contactor. In these two cases, the generator is therefore disconnected in order to avoid a dormant failure of the electrical power generation system. "Dormant failure" means a failure which is not detected during normal operation and which is detected only when the failed function needs to be carried out. In other words, it is a failure which is not detected prior to the attempt to carry out the failed function.

Advantageously and according to the invention, the assistance method comprises a step of failure management without sending a disconnection signal to the generator, said step being carried out when the regulator and the contactor actuator are disconnected prior to the step of disconnecting the regulator from the contactor actuator, when the contactor actuator and the power source are not connected following the step of connecting the contactor actuator to the power source, or when the contactor does not close following the step of connecting the contactor actuator to the power source.

According to this aspect of the invention, the method takes into account the possibilities of the connections not being carried out as intended, or of the contactor not closing despite the power source being connected to the contactor actuator. In these different cases, the contactor is open, the generator is therefore not connected to the power supply architecture and therefore it is not necessary to send a disconnection signal to the generator.

Advantageously and according to the invention, the step of failure management without sending a disconnection signal to the generator is triggered after a predetermined time when the contactor does not close following the step of connecting the contactor actuator to the power source.

According to this aspect of the invention, the assistance method waits, for a predetermined time, for confirmation of the closure of the contactor and, if this time period is exceeded, assumes that the closure attempt has failed and triggers a step of failure management without sending a disconnection signal to the generator.

Advantageously and according to the invention, the assistance method comprises a step of electrical malfunction management during which the contactor actuator is disconnected from the regulator and from the power source, said step being carried out if the assistance method detects an electrical malfunction by means of voltage measurements at a point of regulation located between the generator and the contactor.

According to this aspect of the invention, the method acts as protection against the electrical malfunctions by disconnecting the contactor actuator from both the power source and the regulator, which causes the opening of the contactor and thus the disconnection of the generator and the distribution architecture.

Advantageously, the assistance device according to the invention implements the assistance method according to the invention.

Advantageously, the assistance method according to the invention is implemented by the assistance device according to the invention.

The invention also relates to an assistance device, an electrical power generation system, an assistance method, characterised in combination by all or some of the features mentioned above or below.

5. LIST OF FIGURES

Figure 2:
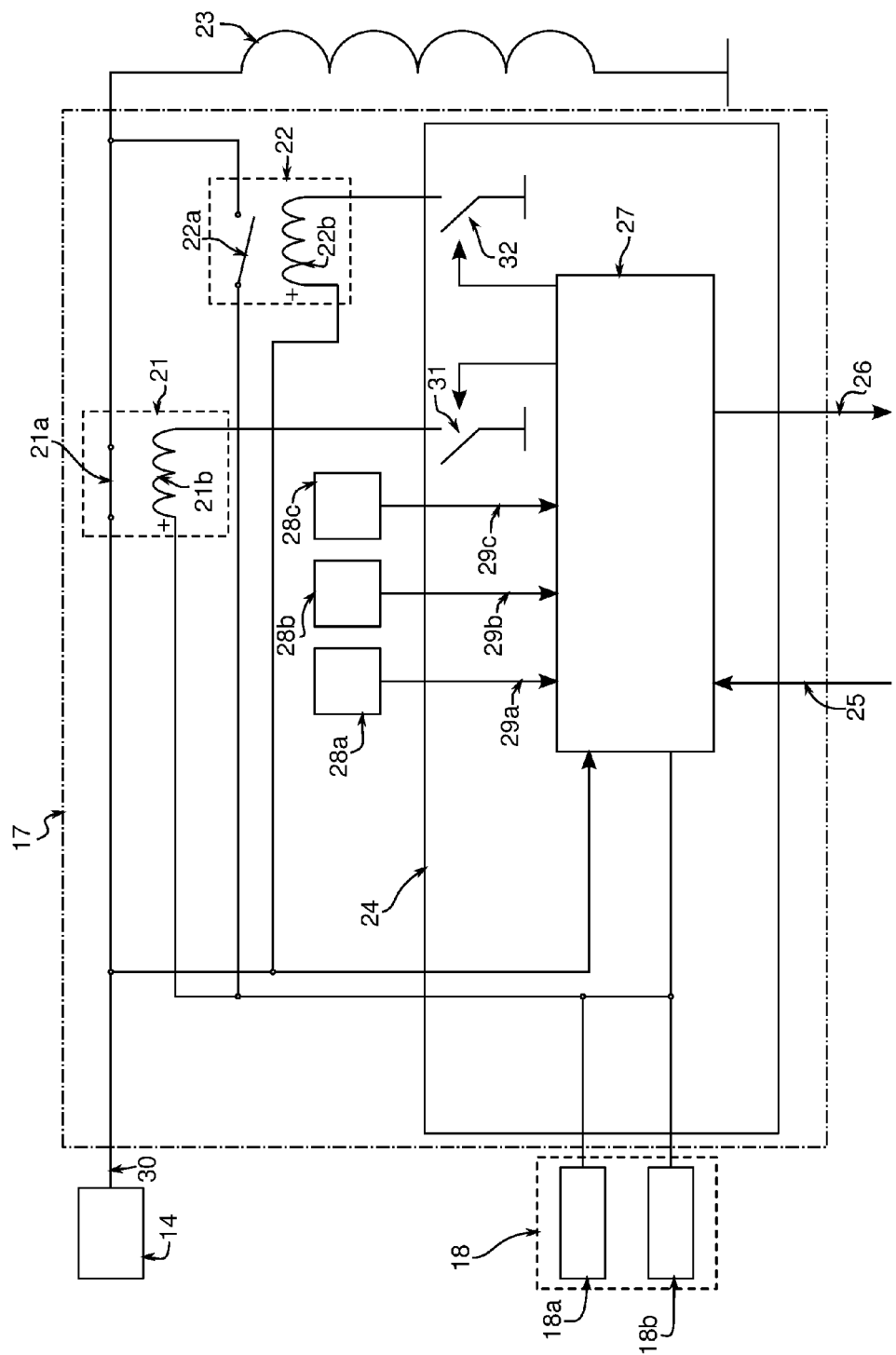

Other aims, features and advantages of the invention will emerge upon reading the following description, which is entirely non-limiting and which makes reference to the accompanying figures, in which:

FIG. 1 is a schematic view of an electrical architecture of an aircraft, comprising an assistance device according to an embodiment of the invention, FIG. 2 is a schematic view of the assistance device according to an embodiment of the invention.

6. DETAILED DESCRIPTION OF AN EMBODIMENT OF THE INVENTION

FIG. 1 schematically shows an electrical architecture of an aircraft 10, comprising an electrical power generation system 11 and a distribution architecture 12. The electrical power generation system 11 comprises a 115 V or 230 V AC generator 13, a regulator 14 and a contactor 15 which connects the generator 13 to the distribution architecture 12. The distribution architecture 12 generally comprises a main AC busbar 16 and a DC busbar (not shown) which is supplied by the main bar via an AC/DC convertor (not shown). An assistance device 17 recovers a signal 30 intended for the actuator of the contactor 15 and originating from the regulator 14, and sends a signal to the actuator of the contactor 15. The assistance device 17 is supplied by a power source 18 which can provide the system 11 with the current necessary for closing the contactor 15 on account of means for closing the contactor, below with reference to FIG. 2. Indeed, in this embodiment, the regulator 14 cannot provide the current necessary for closing the contactor 15. The regulator 14 can, however, provide the current necessary for keeping the contactor 15 closed. The assistance device 17 also has means 20 for measuring voltages and frequencies at a point close to a point of regulation 19 (POR) located between the generator 13 and the contactor 15, immediately upstream of the contactor 15.

FIG. 2 schematically shows an assistance device 17 according to an embodiment of the invention. The assistance device 17 comprises an electronic board 24 and means for closing the contactor 15. Said means for closing the contactor comprise, in this embodiment, two relays. Each relay comprises contacts and a coil for actuating the opening/closing. The first relay 21 is a normally closed relay, the contacts 21a of which connect the actuator 23 of the contactor 15 to the regulator 14, and the actuation coil 21b of which is connected to the power source 18. The second relay 22 is a normally open relay, the contacts 22a of which connect the actuator 23 of the contactor 15 to the power source 18, and the actuation coil 22b of which is connected to the regulator 14. Here, "actuator 23 of the contactor 15" means the coil which receives the actuation signal for closing or opening the contactor 15. The contactor 15 is a normally open contactor, i.e. it is open when there is no power in the coil 23 thereof. The device 17 also receives a signal 25 indicating the state of the contactor 15. The device 17 can output a signal 26 to the regulator 14 in order to request the disconnection of the generator 13. The device 17 is connected to the power source 18 which supplies a logic circuit 27 of the electronic board 24. In this embodiment, the power source 18 consists of two sources 18a and 18b in order to allow a redundancy.

The device 17 comprises means 28a, 28b, 28c for measuring the voltage, which constantly measure the three phase voltages of the generator 13 close to the POR 19. The logic circuit 27 has three inputs 29a, 29b, 29c which retrieve said voltage measurements 28a, 28b, 28c.

The assistance device 17 intervenes with the actuator 23 of the contactor 15 according to an assistance method based on the connections and disconnections of the different elements of the electrical power generation system 11 and of the assistance device 17. In this embodiment, the relays 21 and 22 of the assistance device 17 make it possible to carry out said connections and disconnections according to a number of steps.

The assistance method for closing the contactor 15 comprises the following steps, successively:
  opening the first relay 21 in order to disconnect the regulator 14 form the actuator 23 of the contactor 15;
  closing the second relay 22 in order to connect the actuator 23 of the contactor 15 to the power source 18 so as to supply the actuator 23 with the current necessary for closing said contactor;
  closing the first relay 21 in order to connect the regulator 14 to the actuator 23 of the contactor 15 so that the regulator 14 keeps the contactor 15 closed;
  opening the second relay 22 in order to disconnect the actuator 23 of the contactor 15 from the power source 18 so that the regulator 14 retains the function of monitoring the opening of the contactor 15 without disruption by the assistance device 17.

The step of connecting the power source 18 to the actuator 23 of the contactor 15 in order to provide the current necessary for closing said contactor is carried out by means of closing the second relay 22, the actuation coil 22b of which is connected to the regulator 14. Since the second relay 22 is normally open, the closure signal 30 sent by the regulator 14 is necessary for closing the second relay 22. Therefore, the contactor 15 is not closed if there is no signal 30 originating from the regulator 14, which regulator thus monitors the control of the contactor 15.

The step of connecting the regulator 14 to the actuator 23 of the contactor 15 is carried out by means of closing the first relay 21, the actuation coil 21b of which is connected to the power source 18. Since the first relay 21 is normally closed, this step is only carried out in the event of the first relay 21 being kept in the open position due to the coil 21b of the first relay 21 being supplied with power by the power source 18. Thus, when the power source 18 stops supplying said coil 21b, the first relay 21 closes again. If this step follows the step of connecting the power source 18 to the actuator 23 of the contactor 15, it therefore makes it possible to keep the contactor 15 closed by supplying power to the actuator 23 of the contactor 15 by means of the regulator 14. The regulator 14 thus retains the function of monitoring the contactor 15 and can open said contactor if necessary (by stopping the supply of power to the actuator 23 thereof).

These steps are carried out by means of power being supplied to the coils of the relays by the power source 18, for the first relay 21, and by the regulator 14, for the second relay 22, as well as by two interrupters SW1 31 (for the first relay 21) and SW2 32 (for the second relay 22) of the assistance device 17 which close or open the circuits in which said coils 21b and 22b are located.

In parallel with this method under normal operation, the method also comprises steps for managing failure or electrical malfunction in the generator 13.

A step of electrical malfunction management is carried out if the generator 13 detects an electrical malfunction in the 3 phases of the POR 19. The device 17 then opens the two relays 21 and 22 in order to disconnect the actuator 23 of the contactor 15 from the regulator 14 and from the power source 18 in order to cause the contactor 15 to open and thus the disconnection of the generator 13 from the distribution architecture 12. Said malfunctions may include an overvoltage, undervoltage, excess frequency or any other malfunction which the assistance device 17 can detect on account of the means 20 for measuring voltages and frequency and which would require disconnection of the generator 13 from the distribution architecture 12. This protective function is in addition to a protective function which is already ensured by the regulator 14. This makes it possible to improve the protection without changing the behaviour of the regulator 14 and thus without calling into question the certifications thereof.

A failure may occur if one of the relays does not behave as intended according to the steps of the method, or if the contactor 15 does not close following the step of closing the second relay 22.

A step of failure involving sending a disconnection signal 26 to the generator 13 is triggered in the following cases:
the first relay 21 is "sealed closed", i.e. it does not open following the step of opening the first relay 21. In this instance, the generator 13 has to be disconnected because the assistance device 17 can no longer ensure protection against the electrical malfunctions.
The second relay 22 is "sealed closed", i.e. it does not open following the step of opening the second relay 22. In this instance, the generator 13 has to be disconnected because the regulator 14 can no longer open the contactor 15.

A step of failure without sending a disconnection signal to the generator 13 is triggered in the following cases:
the first relay 21 is "sealed open", i.e. it is open prior to the step of opening the first relay 21. In this case, the contactor 15 is open and therefore it is not necessary to disconnect the generator 13, but it is impossible to carry out the method under normal operation.
The second relay 22 is "sealed open", i.e. it does not close following the step of closing the second relay 22. In this instance, the power source 18 cannot be connected to the actuator 23 of the contactor 15 and so said contactor cannot be closed because the regulator 14 is unable to do so. It is therefore not necessary to disconnect the generator 13, but it is impossible to carry out the method under normal operation.
The contactor 15 does not close following the step of closing the second relay 22. In this instance, the contactor 15 therefore remains open and so it is not necessary to disconnect the generator 13, but it is impossible to carry out the method under normal operation.

The device 17 detects when the relays are "sealed open" or "sealed closed" by means of status signals (not shown) of the relays retrieved by the device 17. Likewise, the retrieval of a status signal 25 of the contactor 15 by the device 17 makes it possible to monitor whether the contactor 15 is correctly open or closed.

The invention claimed is:

1. Assistance device for an electrical power generation system of an aircraft, said system comprising a generator, a regulator and a contactor comprising contacts and an actuator for opening/closing the contacts which is controlled by said regulator and arranged between the generator and a distribution architecture, wherein the assistance device is connected to at least one power source which is separate from the generator and the regulator, wherein it comprises means for closing the contactor, said means for closing the contactor being suitable for connecting the power source to the actuator of the contactor in order to provide the current necessary for closing said contactor, and wherein the means for closing the contactor comprise a first electric relay comprising contacts and an actuator for opening/closing the contacts, said contacts being suitable for connecting the regulator to the actuator of the contactor, and the actuator of said relay being connected to the power source.

2. Device according to claim 1, wherein the means for closing the contactor comprise an electric relay, referred to as a second relay, comprising contacts and an actuator for opening/closing the contacts, said contacts being suitable for connecting the power source to the actuator of the contactor, and the actuator of said second relay being connected to the regulator.

3. Device according to claim 2, wherein the first relay is a normally closed relay and the second relay is a normally open relay.

4. Device according to claim 1, wherein it comprises means for measuring the voltage and the frequency close to a point of regulation located between the generator and the contactor.

5. Assistance method for an electrical power generation system for an aircraft, comprising a generator, a regulator and a contactor comprising contacts and an actuator for opening/closing the contacts which is controlled by said regulator and arranged between the generator and a distribution architecture, wherein it comprises a step of connecting the actuator of the contactor to at least one power source which is separate from the generator and the regulator in order to provide the current necessary for closing said contactor, and wherein it comprises the following steps, successively:

a step of disconnecting the regulator from the actuator of the contactor;

said step of connecting the actuator of the contactor to the power source in order to cause the closure of said contactor;

a step of connecting the regulator to the actuator of the contactor in order to keep the contactor closed;

a step of disconnecting the actuator of the contactor from the power source.

6. Assistance method according to claim 5, wherein it comprises a step of failure management involving sending a disconnection signal to the generator, said step being carried out when the regulator and the actuator of the contactor are not disconnected following the step of disconnecting the regulator from the actuator of the contactor, or when the actuator of the contactor and the power source are not disconnected following the step of disconnecting the actuator of the contactor from the power source.

7. Assistance method according to claim 5, wherein it comprises a step of failure management without sending a disconnection signal to the generator, said step being carried out when the regulator and the actuator of the contactor are disconnected prior to the step of disconnecting the regulator from the actuator of the contactor, when the actuator of the contactor and the power source are not connected following the step of connecting the actuator of the contactor to the power source, or when the contactor does not close following the step of connecting the actuator of the contactor to the power source.

8. Assistance method according to claim 7, wherein said step of failure management without sending a disconnection signal to the generator is triggered after a predetermined time when the contactor does not close following the step of connecting the actuator of the contactor to the power source.

9. Assistance method according to claim 5, wherein it comprises a step of electrical malfunction management during which the actuator of the contactor is disconnected from the regulator and from the power source, said step being carried out if the assistance method detects an electrical malfunction by means of voltage measurements at a point of regulation located between the generator and the contactor.

* * * * *